United States Patent [19]
Barbee

[11] 3,861,207
[45] Jan. 21, 1975

[54] APPARATUS FOR MEASURING WEB TENSION
[75] Inventor: Eugene H. Barbee, Rochester, N.Y.
[73] Assignee: Eastman Kodak Company, Rochester, N.Y.
[22] Filed: Dec. 20, 1973
[21] Appl. No.: 426,974

[52] U.S. Cl. .................................................. 73/144
[51] Int. Cl. .............................................. G01l 5/08
[58] Field of Search...................... 73/143, 144, 159; 242/75.43

[56] References Cited
UNITED STATES PATENTS
| | | | |
|---|---|---|---|
| 3,201,985 | 8/1965 | Williams | 73/143 |
| 3,312,415 | 4/1967 | Jeans | 242/75.43 |
| 3,779,074 | 12/1973 | Breyer | 73/144 |

Primary Examiner—James J. Gill
Attorney, Agent, or Firm—K. D. Fosnaught

[57] ABSTRACT

Apparatus is provided for measuring the tension of a web stretched between two supporting members. The web is positioned over an arcuate surface in which apertures are arranged in a plurality of rectangular patterns. Angled air jets, forced from these apertures, form substantially isolated air cushions within each rectangular pattern which support the web and provide a desired clearance between it and the arcuate surface. The tension in a section of the web supported by a given air cushion is determined by sensing the air pressure in that air cushion at a pressure tap hole provided in the center of the rectangular pattern of apertures used to generate the air cushion.

6 Claims, 3 Drawing Figures

PATENTED JAN 21 1975

3,861,207

APPARATUS FOR MEASURING WEB TENSION

BACKGROUND OF THE INVENTION

1. Field of the Invention

This invention relates to web tension measuring devices and, more particularly, the apparatus for simultaneously measuring web tension by fluidic means in a number of discrete sections of a web stretched between two supports.

2. Description of the Prior Art

The prior art shows numerous devices for measuring web tension that utilize a movable member, e.g., a roller, which is resiliently mounted between two spaced supports and maintained in contact with a web surface by weights or spring pressure. Variations in the roller position, produced by variations in web tension, are mechanically communicated to a tension responsive means which varies web tension as a function of roller position to maintain the desired web tension. While devices of this type are useful in many applications, the inertia of the roller and the required mechanical linkages limit the ability of such devices to respond accurately to rapid variations in web tension. Additionally, the size and mechanical complexities of such devices make them impractical for use in measuring web tension at certain points in a web handling machine. Finally, since such devices require frictional contact with a web, they are not desirable for use with fragile webs or webs that are wet with a coating composition.

Efforts have been made to overcome the problems inherent in mechanical web tension measuring devices by using pneumatic tension sensing equipment to provide air pressure signals proportional to web tension. In such equipment, a web is passed over an arcuate surface containing one or more air holes through its cross-section. A compressed air supply forces jets of air through the holes to form a web supporting air cushion between the web and the arcuate surface. As described in M. R. Jeans, U.S. Pat. No. 3,312,415, issued Apr. 4, 1967, one approach to monitoring web tension with pneumatic equipment is to supply air to the holes in an arcuate surface through a closed air supply passage that also has a branch connected to a pressure sensing device, such as a pressure diaphragm or a pressure actuated slide valve. In essence, this approach measures web tension as a function of the air pressure in the air supply passage. For example, when the tension between the web and the web slackens, the air cushion between the web and the arcuate surface widens and the resulting pressure drop in the air supply passage is communicated to the pressure sensing device.

Another approach to monitoring web tension pneumatically is described in K. S. Williams, U.S. Pat. No. 3,201,985, issued Aug. 24, 1965. In the Williams device, there are two sets of holes in the arcuate surface, each serving a different purpose. The first set of holes is used to form an air cushion between the arcuate surface and a web by forcing jets of air through the set of holes in the manner described in the Jeans patent. The second set of holes is used to sense the air pressure at selected points along the arcuate surface. The sets of holes are arranged in parallel rows that run the length of the arcuate surface with a row of holes used for pressure sensing being centrally located between rows of holes from which air jets are forced. In essence, the Williams device measures web tension as a function of the air pressure at the various points along the arcuate surface where the pressure sensing holes are located. The air pressure at each of these pressure sensing holes is coupled to a pressure measuring device, e.g., a manometer, which records the pressure at its associated hole in terms of the tension of the web immediately above that hole.

While the devices described in the Williams and Jeans patents provide measurements of web tension, it appears that they are likely to erroneously indicate the need for web tension correction in certain situations. More specifically, as a result of the arrangement of the holes in the arcuate surfaces used in both devices, only web tension immediately above the holes is used in determining overall web tension. Consequently, a localized change in web wrap, contour, or position over a pressure measuring hole may be incorrectly interpreted as a change in overall web tension requiring correction. Similarly, the presence of tension in a section of the web that is not located immediately above the holes may not be detected. Additionally, the hole arrangements used in the Williams device allows air flow over the arcuate surface that can produce erroneous pressure readings at the pressure sensing holes, and this further affects the accuracy of the web tension measurement. Finally, the hole arrangement used in both devices adversely affects their efficiency, since air escapes around the edges of the web without first contributing to the web supporting air cushion. Consequently, a higher rate of air flow is required to maintain a given air cushion than if all the air were efficiently used.

SUMMARY OF THE INVENTION

In accordance with the invention, a plurality of substantially isolated air cushions are generated to support a portion of a web, and an indication of the tension distribution in the web is obtained by measuring the pressure of each air cushion. More particularly, the isolated air cushions are generated by forcing jets of air through holes, in an arcuate surface, that are arranged in a row of adjacent, but separate, closed geometric patterns transverse to the longitudinal axis of the web. The holes forming each closed geometric pattern, such as a rectangle, direct the air jets toward the center of the pattern to generate a web supporting air cushion that is substantially isolated from the effects of air flow used to produce other air cushions along the arcuate surface. A pressure tap hole, provided within each of the closed geometric patterns, couples the pressure of its associated air cushion to a pressure sensing means, such as a manometer, which is calibrated in terms of web tension units.

The invention provides several advantages over prior art web tension monitoring devices. A primary advantage is that a more accurate web tension distribution measurement is obtained when web tension is determined as a function of the pressure in a plurality of substantially isolated air cushions used to support adjacent sections of a web. The use of the isolated air cushions minimizes the effects of air flow used to create one air cushion on the air pressure in neighboring air cushions. Another important advantage of the invention is that the adverse effect of localized web tension, located directly above a pressure sensing hole, on the accurate measurement of tension distribution over a section of a web is minimized, since the pressure differential that it creates is averaged over the area of the air cushion supporting the web section. Additionally, this averaging also results in the tension measurement reflecting the existence of localized web tensions that are above the air cushion, but not directly above the pressure sensing hole. Yet another important advantage of the invention is that, due to the use of patterns of inclined air jets in forming the air cushions, less air volume is required to provide support for a web, and this reduces problems created by dynamic air flow between the web and an arcuate surface from which the air jets are forced.

OBJECTS OF THE INVENTION

It is an object of the invention to minimize the effects of localized web contour changes on the accuracy of web tension measurements.

It is another object of the invention to reduce the problems resulting from dynamic air flow effects produced when air is used to support a web.

It is a more specific object of the invention to increase the accuracy of a pneumatic web tension measuring device by using inclined air jets to minimize the effect of web contour, wrap, and position on web tension measurements.

It is a more specific object of the invention to increase the efficiency of a pneumatic web tension measuring device by using inclined air jets, arranged in a closed geometric pattern, to form a web supporting air cushion.

It is a more specific object of the invention to provide a pneumatic web tension measuring device of improved accuracy wherein the air jets used to provide a web supporting air cushion are arranged in a closed pattern about a pressure sensing hole in such a manner that the pressure sensing hole is substantially isolated from the effects of nearby air jets used to form additional web supporting air cushions.

It is a still more specific object of the invention to increase the accuracy and efficiency of a pneumatic web tension measuring device by using a plurality of rectangular air jet patterns to form a plurality of substantially isolated air cushions that provide support for a web and by determining web tension as a function of the pressure in each of the air cushions.

The invention, and its objects and advantages, will become more apparent in the detailed description of the illustrative embodiments presented below.

BRIEF DESCRIPTION OF THE DRAWINGS

In the detailed description of the illustrative embodiment of the invention presented below, reference is made to the accompanying drawings, wherein the same reference characters indicate corresponding parts throughout the several views of the drawings, and in which.

DESCRIPTION OF THE ILLUSTRATIVE EMBODIMENT

Because web tension measuring devices are well known, the present description will be directed in particular to elements forming part of, or cooperating more directly with, the present invention. Web tension measuring elements not specifically shown or described may take various forms well known to those skilled in the art.

Figure 1:
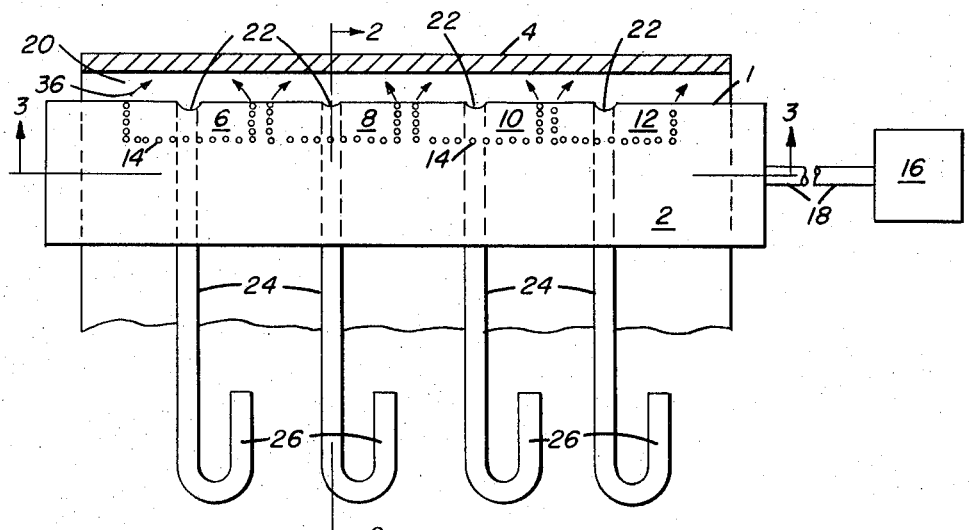
FIG. 1 is a front elevation of an embodiment of the invention.
Figure 2:
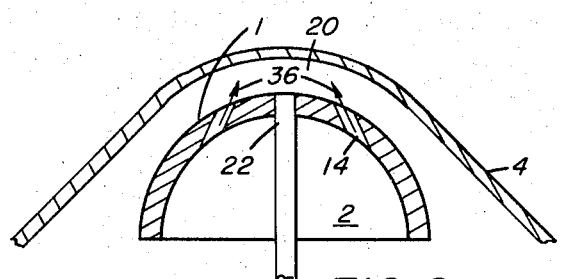
FIG. 2 is a section through line 2—2 of FIG. 1.

In FIGS. 1 and 2, a chamber 2 sealed at both ends is provided with an arcuate surface 1 of suitable length to span a web 4. The web 4 may be either stationary or moving, since the tension measurements are independent of web speed. The arcuate surface 1 contains a number of holes 14 arranged in closed geometric patterns which, for purposes of illustration, are shown as rectangular patterns 6,8,10, and 12. While only four rectangular patterns of holes are shown, it will be understood that the number of hole patterns can be varied to accommodate the type and size of web material involved. Similarly, as mentioned above, the rectangular patterns of holes are only illustrative and can be replaced with a number of different types of closed geometric patterns.

In the illustrative embodiment, a pump 16 (FIG. 1) supplies air to the interior of the chamber 2 through a supply pipe 18. As a result of the air being compressed in the chamber 2, jets of air are forced through the holes 14 in each rectangular pattern of holes and form an air cushion 20 over each pattern to support the web 4 out of contact with the arcuate surface 1. The holes 14 and, accordingly, the air jets 36 are inclined inwardly toward the center of each rectangular pattern. While the angle of inclination of the air jets can vary, an angle of 45° provides satisfactory results in many applications. The use of closed patterns of angled air jets to produce web supporting air cushions results in (1) each air cushion being substantially isolated from the effects of air jets used to produce neighboring air cushions, and (2) more clearance between the web 4 and the surface 1 for a given amount of air pressure than would be obtained if the air jets were not inclined. The increased web clearance, in turn, results in the increased size of each air cushion which, as will be described later, results in a more accurate measurement of tension distribution in the web.

Figure 3:
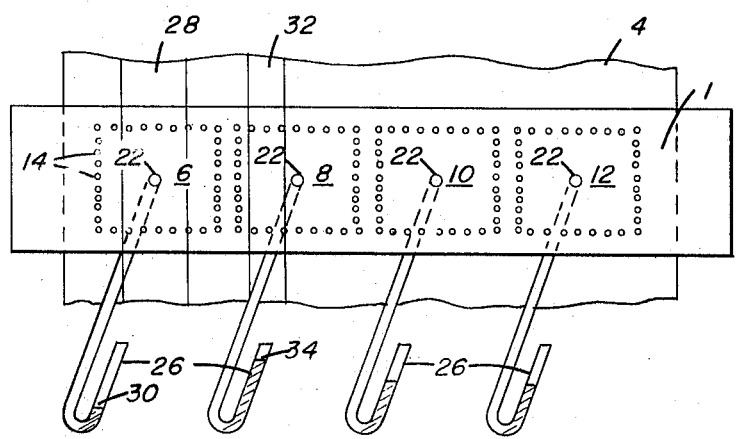
FIG. 3 is a section through line 3—3 of FIG. 1.

At the centers of the rectangular patterns 6,8,10,12, pressure tap holes 22 are provided in the wall of the arcuate surface 1 and are connected independently by pipes 24 to separate manometers 26. A manometer is used by way of example; however, it will be understood that any suitable pressure measuring device may be substituted in its place. Each manometer 26 will measure the pressure of the air in the cushion 20 adjacent to the area included within the rectangular pattern of apertures 14 containing the pressure tap hole to which it is connected. Since this value is related to the tension distribution in the sections of the web 4 above the rectangular patterns, each manometer 26 is, for convenience, calibrated in units of tension. Thus, as shown in FIG. 3, the pressure and position of a slack longitudinal band or lane 28 in the web 4, located above the rectangular pattern 6, will be indicated by a low reading 30 on the corresponding manometer 26 when compared with the readings on the other manometers 26. Similarly, a tight longitudinal band or lane 32 in the web 4, located above the rectangular pattern 8, will be indicated by a high reading 34 on the corresponding manometer 26, compared with the readings on the remaining manometers 26.

As shown in FIG. 3, the high tension in a tight longitudinal band, such as band 32, is sensed by the corresponding manometer 26, if the band 32 passes substantially over the rectangular pattern 8. The effect of such a tension is a uniformly distributed increase of pressure within the air cushion which can be sensed at a pressure tap hole. Similarly, a slack longitudinal band, such as band 28, will produce a uniform pressure decrease within the air cushion generated by jets of air forced from the rectangular pattern 6. This pressure distributing feature of the air cushion also minimizes the possibility of a localized web tension located directly above a pressure sensing tap producing an erroneous indication of tension distribution in the section of the web supported by the air cushion. More specifically, the increase in air cushion pressure resulting from such a tension is uniformly distributed throughout the air cushion and, in essence, averaged with the existing air cushion pressure. The resulting pressure present at the pressure tap hole is a function of this pressure increase averaged with any pressure changes produced by other tensions in the section of the web supported by the air cushion. Consequently, the measured pressure is a function of the distribution of tensions present in the section of the web supported by the air cushion.

In the illustrative embodiment, the pressure tap holes 22 are located centrally in the area included within the rectangular hole patterns 6,8,10, and 12. This central location substantially isolates the pressure tap hole 22 in a given rectangle 6 from the effects of air jetting from the holes in the other rectangular hole patterns. Consequently, the effects of air flow outside of a rectangular hole pattern on the pressure sensed at a pressure tap hole located within the rectangular hole pattern are minimized, and this results in the sensed pressure providing a more accurate indication of the tension in the web section above the rectangular hole pattern in which the pressure tap hole is located.

While the foregoing has described the invention in terms of a specific illustrative embodiment, it is clear that it is not limited to this embodiment. For example, there may be situations where it is desirable to use a fluid other than air to produce web supporting cushions. Similarly, the rectangular patterns of holes may be replaced with a number of other closed geometric hole patterns and the location of pressure tap holes does not necessarily have to be located precisely at the center of a closed geometric pattern. Additionally, the shape of the arcuate surface, and its position relative to a web, may vary depending upon the environment in which the invention is used. Finally, the manometers used in sensing pressure can be replaced with pressure transducers that produce signals used in automatically controlling web tension.

In summary, the invention has been described in detail with particular reference to an illustrative embodiment, but it will be understood that variations and modifications can be effected within the spirit and scope of the invention.

What is claimed is:

1. Apparatus for measuring the tension in a web, which apparatus comprises:
   a. an arcuate surface over which the web is passed, said surface having apertures through which a fluid is supplied under pressure to provide a supporting fluidic cushion between the under surface of the web and said surface, said apertures being arranged in at least one closed, continuous pattern;
   b. supply means for continuously supplying said fluid under pressure to said apertures;
   c. at least one pressure tap hole in said surface, said pressure tap hole being positioned within the space enclosed by said closed, continuous pattern of said apertures; and
   d. pressure measuring means in communication with said pressure tap hole for indicating the pressure of said fluid in said fluidic cushion in the vicinity of said pressure tap hole.

2. Apparatus as claimed in claim 1 wherein said apertures are inclined inwardly toward the center of said closed, continuous patterns of said apertures.

3. Apparatus as claimed in claim 2 wherein said apertures are arranged as at least two adjacent rectangles along an axis transverse to the longitudinal axis of said web.

4. Apparatus as claimed in claim 3 wherein said surface contains at least one pressure tap hole located within the boundary of each rectangular pattern of apertures.

5. Apparatus as claimed in claim 1 wherein said fluid comprises air.

6. Apparatus as claimed in claim 1 wherein said pressure measuring means comprises a manometer.

* * * * *